Oct. 12, 1926.

F. L. HAGUE 1,602,663

FREIGHT CAR TILTING APPARATUS

Filed March 10, 1922     5 Sheets-Sheet 1

INVENTOR
FRANK L. HAGUE
By Paul Paul
ATTORNEYS

Oct. 12, 1926.　　　　　　　　　　　　　　　　　1,602,663
F. L. HAGUE
FREIGHT CAR TILTING APPARATUS
Filed March 10, 1922　　　　5 Sheets-Sheet 3

INVENTOR
FRANK L. HAGUE
By Paul & Paul
ATTORNEYS

Oct. 12, 1926.

F. L. HAGUE 1,602,663

FREIGHT CAR TILTING APPARATUS

Filed March 10, 1922    5 Sheets-Sheet 5

INVENTOR
FRANK L. HAGUE
BY
ATTORNEYS

Patented Oct. 12, 1926.

1,602,663

UNITED STATES PATENT OFFICE.

FRANK L. HAGUE, OF MINNEAPOLIS, MINNESOTA, ASSIGNOR TO FEGLES CONSTRUCTION COMPANY, LIMITED, OF MINNEAPOLIS, MINNESOTA, A CORPORATION OF CANADA.

FREIGHT-CAR-TILTING APPARATUS.

Application filed March 10, 1922. Serial No. 542,672.

The object of my invention is to provide an apparatus for tilting a freight car on its longitudinal axis for the purpose of discharging such a commodity as grain in bulk therefrom, the apparatus being so arranged with respect to the car that an unobstructed space is provided beneath the doors and the middle portion of the car so that the grain may be discharged by gravity upon suitable aprons or conveyors in the pit beneath the car, and the space being unobstructed, a conveyor or apron operating transversely of the car may be used, extending across several parallel tracks and receiving the grain from several cars upon these tracks, thus adapting the apparatus for handling cars over pits already in use and allowing one apron or conveyor to be utilized for a pit extending across several lines of tracks.

A further object is to provide a car tilting apparatus which can be applied to pits already in use at a comparatively small expense and with subsequent economy of operation. In fact, one of the essential features of my invention is to avoid the high cost of installation usually incident to apparatus of this kind.

A further object is to provide a tilting apparatus which will dump the car with a minimum of lateral movement of the car body, thus providing some space at the side of the car for the unloading apparatus.

Other objects of the invention will appear from the following detailed description.

The invention consists generally in various constructions and combinations, all as hereinafter described and particularly pointed out in the claims.

Figure 1:
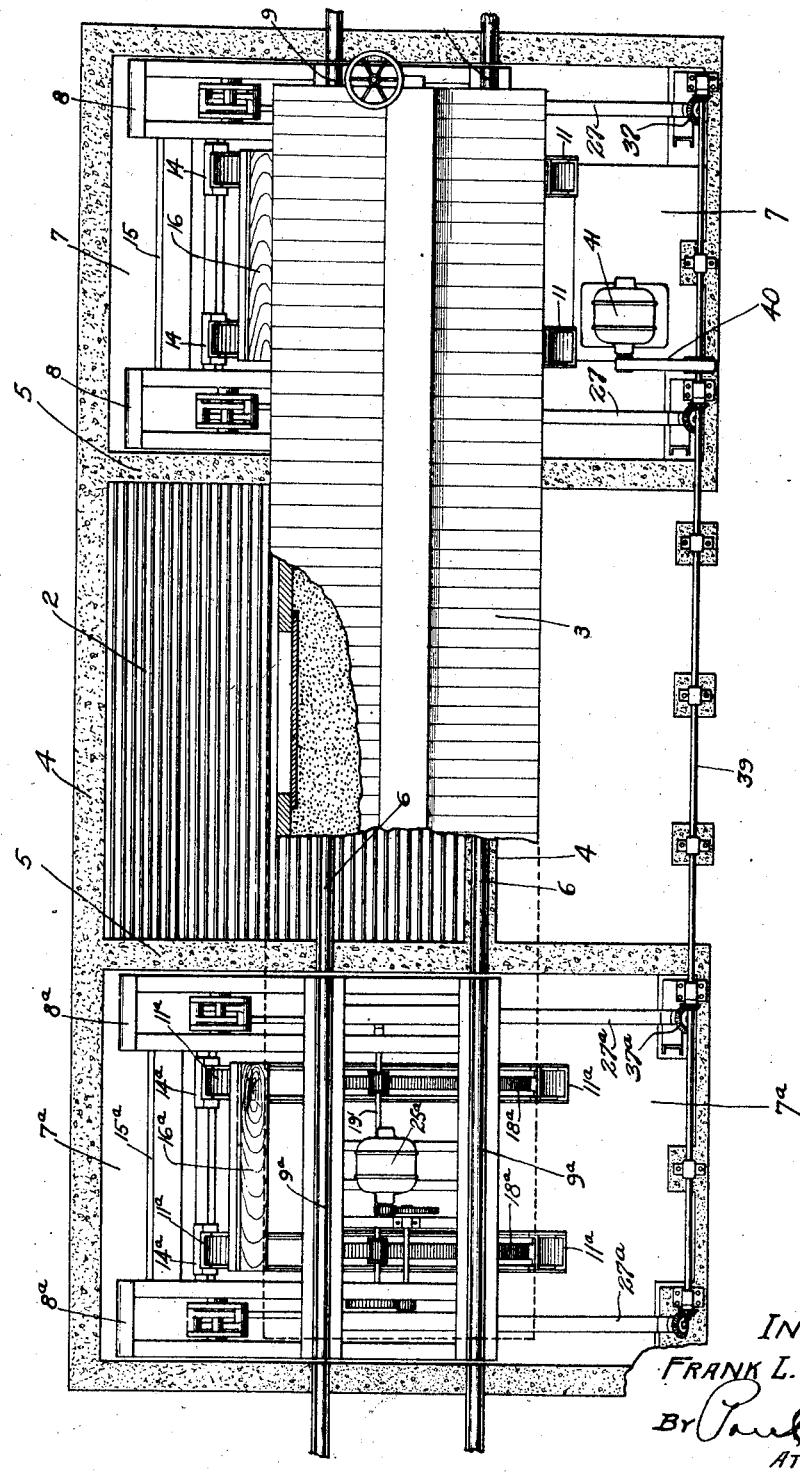
Figure 2:
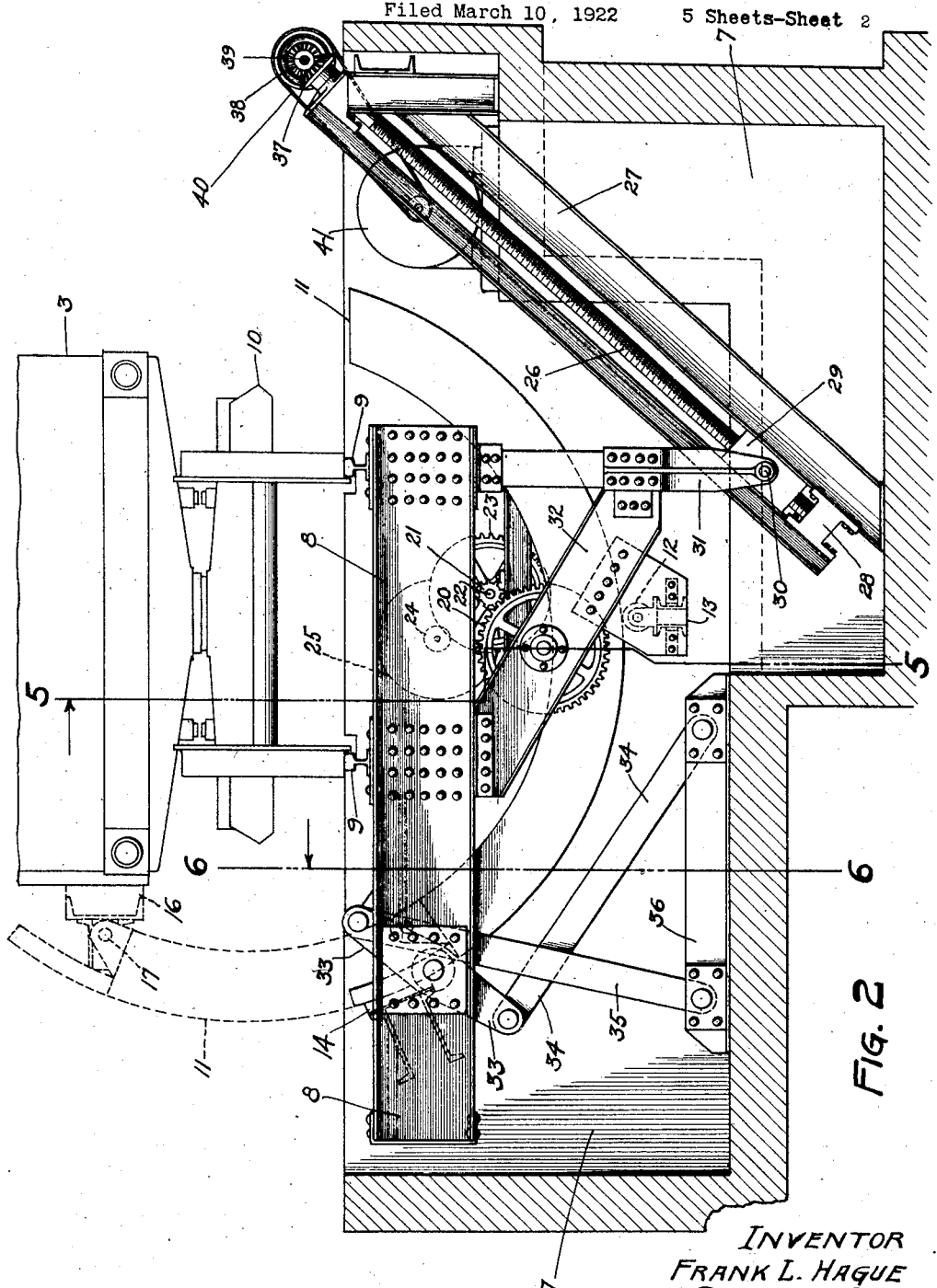
Figure 3:
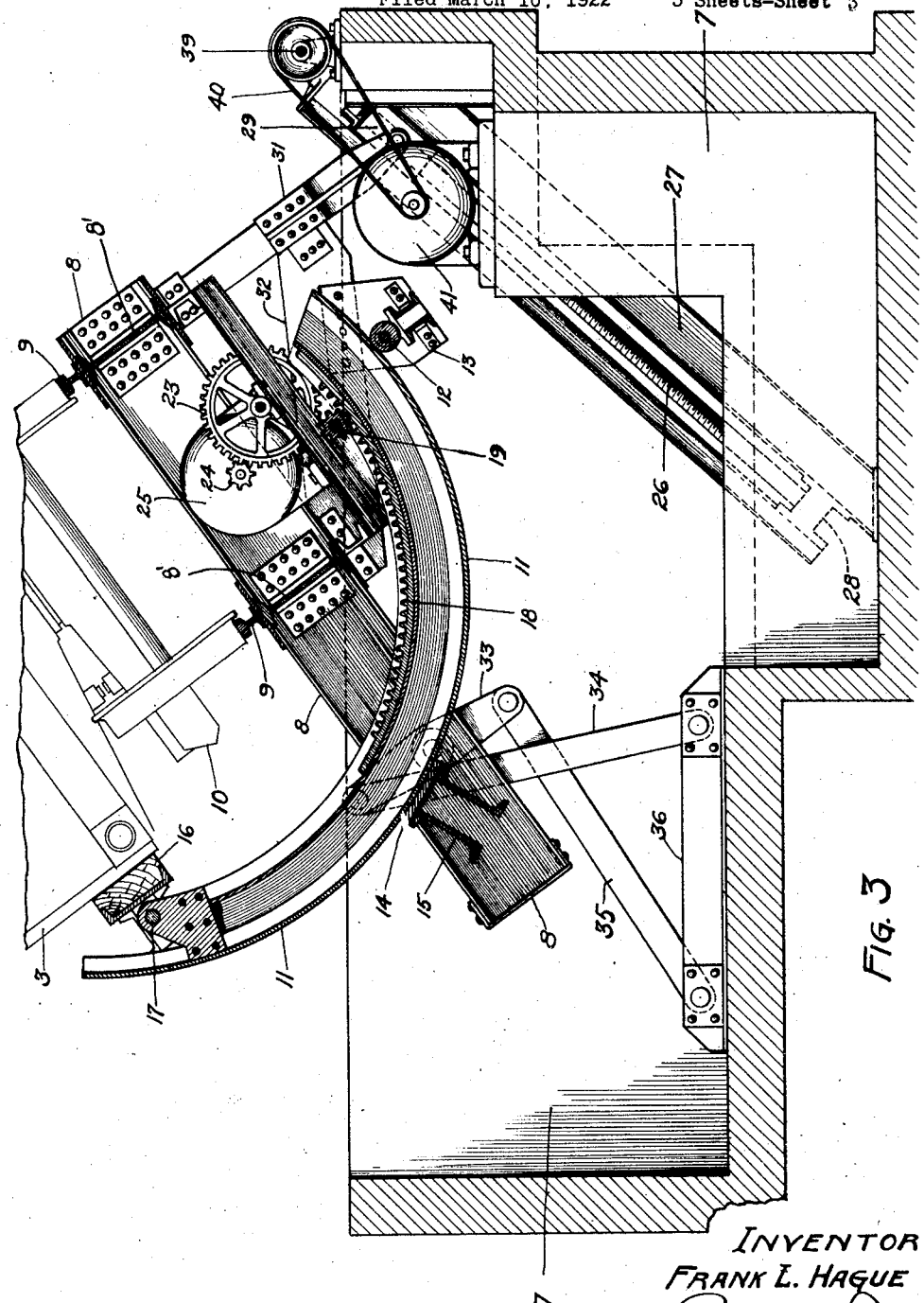
Figure 4:
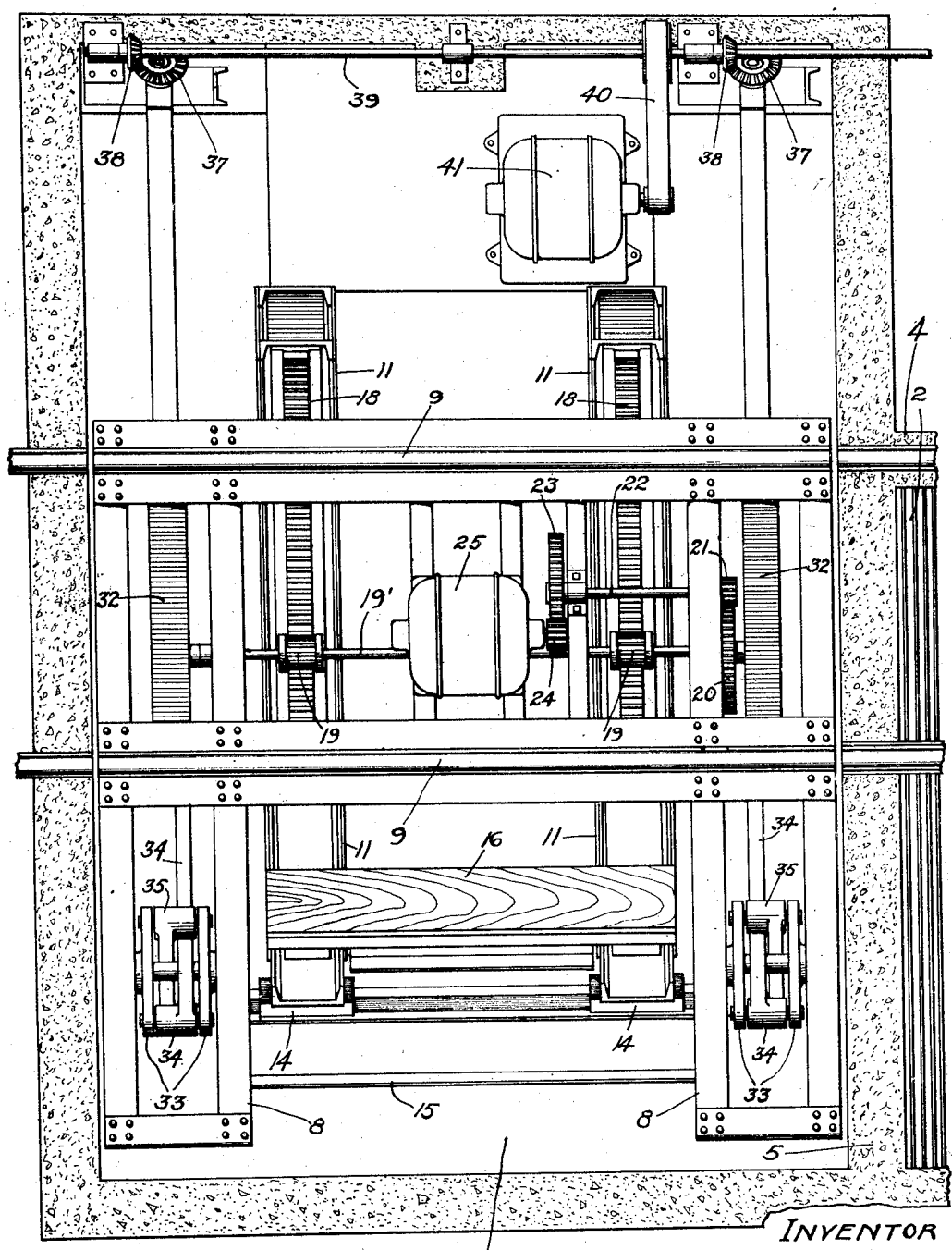
Figure 5:
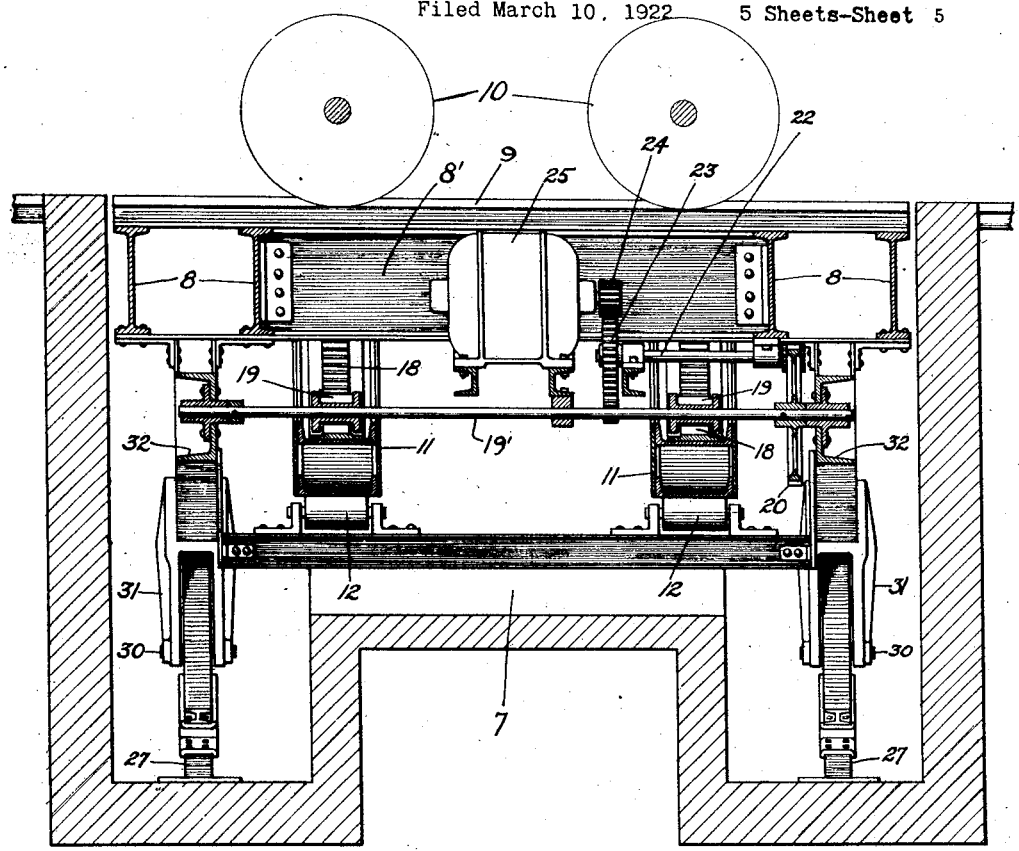
Figure 6:
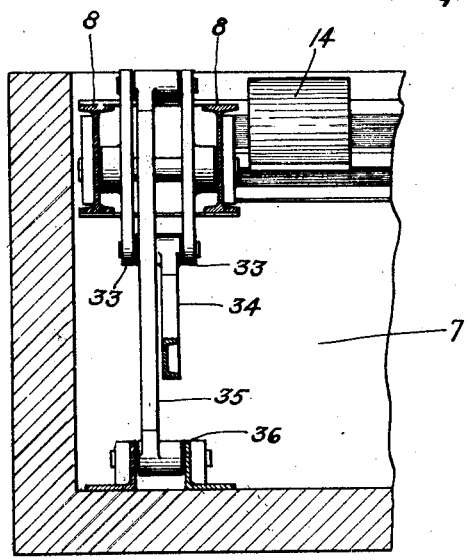

In the accompanying drawings forming part of this specification,

Figure 1 is a plan view, showing a pit, with the location of the car thereover and the car tilting apparatus on each side of the pit, Figure 2 is an end elevation showing the normal position of the tilting apparatus, Figure 3 is a similar view, showing the position assumed by the apparatus when the car is tilted to its dumping position, Figure 4 is a plan view of the apparatus at one end of the car, showing the mechanism for engaging the side of the car and supporting it in its tilted position, Figure 5 is a sectional view on the line 5—5 of Figure 2, Figure 6 is a sectional view on the line 6—6 of Figure 2.

In the drawing, 2 represents the pit over which the loaded freight car is stationed, the pit being enclosed by walls 4 and 5, preferably of concrete, track rails 6, being supported by these walls and being bridged by the car body when it is positioned for dumping. On each side of the pit I provide chambers 7 and $7^a$ wherein the tilting mechanisms for the car is arranged. These mechanisms are in duplicate and a description of one of them will suffice for both, the same reference figures being employed with the addition of the exponent "a".

Referring to the apparatus on the right hand of the pit in Figure 1, 8 represents the side rails of a frame composed preferably of I-beams arranged in pairs and spaced apart and connected by transverse bracing beams 8', said rails and beams being rigidly bolted together to form a substantial supporting frame. Similar rails are provided on the opposite side of the pit, which I will designate by the same reference numeral with the addition of the exponent "a".

Transversely arranged on the frame I provide track rails 9—9 supporting the trucks 10 of the car 3. The track rails are of sufficient length so that when the freight car is properly set, one truck will rest upon the rails 9 at one side of the pit and the truck at the other end of the car will rest upon the rails $9^a$ at the opposite side of the pit. When, therefore, the frames 8 and $8^a$ are tilted, the car and its contents will be correspondingly tilted.

To prevent the car from tilting off the rails when the supporting frames are tilted, I provide arms 11 preferably curved, having bearings at one end upon antifriction rollers 12 supported by brackets 13 which depend from the car supporting frame and at the other end said rails are seated on bearing plates 14 mounted upon transverse bracing members 15. Shoes 16 are pivoted at 17 on one end of the arms 11 and are adapted to bear on the lower walls of the box car, preventing it from tilting too far or becoming detached from the truck when the car is tilted to discharge its load. These arms are preferably arranged in pairs, one pair at each end of the car, and either arm may be operated independently and moved into or out of engagement with the car, as may be desired. When they have been adjusted against the walls of the car, the car box will be positively held against tipping or becoming accidentally moved from its normal discharging position. This adjustment of the arms is a step preliminary to the tilting operation, the car being first positioned over the bed and then the arms are moved to engage their shoes with the walls of the car before the tilting operation is begun.

To operate the pair of arms, I prefer to provide racks 18 secured thereon, arranged to mesh with pinions 19 on a shaft 19'. A gear wheel 20 is secured on this shaft and meshes with a pinion 21 on a counter-shaft 22 that is provided with a gear wheel 23 meshing with a driving pinion 24 on the motor 25. When power is applied to this motor, the aforesaid gearing will be operated to move the arms forward and backward to engage their shoes with the walls of the box car to disengage them therefrom. I prefer to provide a motor and operating mechanism for each device on opposite sides of the pit and each pair of bracing or clamping arms may be operated independently of the other pair, if preferred. Generally, however, power will be applied simultaneously to seat them at the same time against the walls of the box car.

In the pit at each end of the car wherein the dumping apparatus is located, I provide screws 26 arranged in pairs in parallel relation in inclined frames 27. Bearings 28 are provided in said frames for the screws 26 and blocks 29 are movable back and forth on said screws and are pivotally connected at 30 with standards 31 which depend from the car supporting frame above, braces 32 connecting the lower portion of the standards 31 with the middle portion of said frame and rigidly supporting the standards in an upright position. These braces 32 also form supports for the depending hangers 13 hereinbefore referred to. The blocks 29 are free to move upwardly on the screws as they are revolved.

A double yoke 33 is pivotally mounted on the beams 8 and supporting arms 34 and 35 are pivotally connected at their upper ends to the yokes 33, their lower ends being pivoted to a suitable base 36 arranged within the chamber 7 under the car. The function of the supporting arms 34 and 35 is to carry or support one end of the beams 8, and when the tilting operation of the car is begun they will cause the pivot of the yoke to follow substantially a horizontal path. As the screws 26 are revolved, the blocks 29 will travel up the incline in the frames 27, thereby raising and tilting the car to the position shown in Figure 3.

With the tilting apparatus constructed, as above described, the axis of rotation of the car is near the point of contact of the shoes 16 with the car body, there being only a slight horizontal movement at this point as the car is tilted from its horizontal to an inclined position. My object in providing this very slight lateral movement of the car body in tilting is to provide more space at the side of the car for the unloading apparatus to operate through the open door when the car is tilted to its dumping position.

When it is desired to tilt a car for unloading, the motors 25 are started, causing the clamping arms 11 to be moved into the position shown by dotted lines in Figure 2, where they will take up the lateral pressure on the car resulting from the tilting operation, and thereby hold the car firmly on the rails 9, while being unloaded. The arms arranged in pairs in the chambers 7 and 7ª are preferably mounted to move independently of each other, each having a gearing and a motor whereby one may be moved in advance of the other, or, they may be moved simultaneously.

The tilting of the car, however, is effected through the simultaneous tilting of the supports thereof and this is accomplished by providing pinions 37 on the upper ends of the screws 26 meshing with gears 38 on a horizontal operating shaft 39 which extends across the pit from one operating mechanism to another and is driven through a belt 40 from a motor 41. There is one of these motors for the complete apparatus, the tilting of the mechanism being effected simultaneously so that the movement of the car will be the same at both ends. The grain will then be discharged into the pit between the operating apparatus upon suitable conveyers and the space beneath the middle portion of the car being unobstructed, as far as operating mechanism is concerned, it is evident that the same apron or carrier may be extended from the pit of one car to the corresponding pit of the adjacent dump, and one apron or carrier utilized for receiving and feeding the grain discharged from several cars.

I claim as my invention:

1. The combination, with a freight box car dumping pit over which the car is positioned to be dumped on a longitudinal axis to discharge its load and chambers provided upon each side of said pit, of mechanism positioned in said chambers on both sides of said pit for tilting the car from a horizontal to an inclined dumping position to discharge its load through a side door opening.

2. An apparatus for tilting a freight box car on its longitudinal axis comprising means beneath the ends of the car for tilting it laterally, an unobstructed space being provided between said means beneath the middle portion of the car there being chambers provided upon each side of said pit wherein said tilting means is located.

3. The combination, with a freight box car dumping pit, over which the car is positioned to be tilted on a longitudinal axis to discharge its load, of mechanism positioned on both sides of said pit and having means for engaging the car to hold it on its trucks and mechanism for tilting the car to discharge its load, said mechanism including oscillating frames and arms mounted in said frames to engage the car to be tilted.

4. An apparatus for tilting a freight car on a longitudinal axis comprising frames having track rails to receive the trucks at the ends of the car, the space between said frames beneath the middle portion of the car being unobstructed, arms mounted in said frames to engage the side walls of the car preliminary to the tilting operation, and mechanism for simultaneously oscillating said frames to tilt the car on its longitudinal axis.

5. An apparatus for tilting a freight car on a longitudinal axis comprising truck supporting means, means for engaging the side walls of the car body, and mechanism for tilting said supports and said car body engaging means to impart a combined horizontal and rotary movement thereto.

6. The combination, with a car supporting means and arms carried thereby having shoes for contact with the side walls of the car body, and mechanism for tilting said car supporting means and said arms to impart a combined horizontal and rotary movement to said supporting means.

7. A car tilting apparatus comprising a frame having rails for the car trucks, means mounted on said frame for supporting the car in its tilted position, mechanism for tilting said frame, a yoke pivoted on said frame and links connecting said yoke with a fixed support to provide a minimum of lateral movement of the car in tilting it on its longitudinal axis.

8. An apparatus for tilting a freight car on a longitudinal axis comprising frames having track rails to receive the trucks at the ends of the car, the space between said frames beneath the car being unobstructed, arms arranged in pairs in said frames and mounted for independent movement to engage the side walls of the car preliminary to the tilting operation, and mechanism for simultaneously oscillating said frames to tilt the car on its longitudinal axis.

9. The combination, with a freight car dumping pit, of an apparatus arranged on each side of said pit for tilting the car on a longitudinal axis, said apparatus comprising arms slidably mounted having shoes to engage the side walls of the car, and a mechanism for operating said arms, supports whereon the car track rails are mounted, and mechanism for tilting said supports at both ends of the car simultaneously to discharge the car contents.

10. A car tilting apparatus comprising frames and pits therefor at each end of the car, said frames having rails to receive the trucks of the car, means mounted in said frames and movable independently thereof for engaging the side walls of the car to hold it on its trucks, screws mounted at an incline in said pits, blocks mounted on said screws, and standards pivoted on said blocks and connected with said frames for tilting said frames and the car on a longitudinal axis and means for revolving said screws.

11. A car tilting apparatus comprising frames and pits therefor at each end of the car, and rails on said frames to receive the car trucks, screws mounted in said pits and blocks thereon pivotally connected with one end of said frames, parallel link-motions connected with the opposite ends of said frames, means for operating said screws to tilt said frames and the car thereon, and mechanism for engaging the car body to hold it on the trucks during the tilting operation.

12. A car tilting apparatus comprising frames and pits therefor, said frames having track rails adapted to receive the trucks of the car, means for tilting said frames, arms having bearings in said frames and mechanism for projecting and retracting said arms, and shoes mounted on one end of said arms and engaging the side walls of the car to hold the car body on the trucks during the tilting operation, the axis of rotation of the car being near said shoes.

13. An apparatus for tilting a freight box car on a longitudinal axis to discharge its load through a side door, comprising supports having track rails to receive the trucks of the car, means mounted in said supports for engaging the car to hold it in its tilted position, means for projecting and retracting said car engaging means, mechanism for guiding one side of said supports horizontally and mechanism adapted to tilt the other side of said supports vertically to dump the car on an axis adjacent the intersection of the car floor and a side wall.

14. An apparatus for tilting a freight car on a longitudinal axis comprising supports having track rails to receive the trucks of the car, curved means mounted in said supports and having shoes for contact with the car, a motor for projecting and retracting said curved means, and a motor for tilting said supports vertically to dump the car.

15. A freight box car tilting apparatus comprising a frame having rails for the car trucks, means for supporting the car in its tilted position, mechanism for tilting said frame to rotate the car on a longitudinal axis adjacent the intersection of the floor and a side wall to provide a minimum of lateral movement of the car during the tilting movement thereof.

16. An apparatus for tilting a freight car on a longitudinal axis, comprising supports having track rails to receive the trucks of the car, means for holding the car on said supports, links for guiding one side of said supports horizontally and mechanism for tilting the other side of said supports vertically to dump the car.

17. A freight car tilting apparatus comprising supports having track rails to receive the trucks of the car, means under said supports for guiding them, comprising arms pivotally connected to said supports, means for lifting said supports and said car to impart a rotary movement thereto, and means for holding the car on said supports.

18. An apparatus for tilting a freight car on a longitudinal axis comprising supports having track rails to receive the trucks of the car, means for holding the car on said supports and mechanism including inclined screws and blocks mounted to travel thereon pivotally connected with said supports for tilting them to dump the car.

19. An apparatus for tilting a freight box car on a longitudinal axis comprising car truck supporting means, mechanism for tilting said supporting means, and mechanism for guiding said supporting means to adapt it for tilting the car on an axis at the intersection substantially of the car floor and a side wall.

20. An apparatus for tilting a freight box car on a longitudinal axis comprising car truck supporting means, mechanism for tilting said supporting means and a pivoted arm mechanism for guiding said supporting means to adapt it for tilting the car on an axis at the intersection substantially of the car floor and a side wall.

21. A car tilting apparatus comprising frames and pits therefor at each end of the car, and rails on said frames to receive the car trucks, the space between said frames beneath the car being unobstructed, arms mounted in said frames and having shoes for engaging the side walls of the car and adapted for relative independent movement, mechanism for projecting and retracting said arms, yokes mounted on said frames, arms pivotally connected at their upper ends to said yokes and at their lower ends to fixed points, and adapted to support one end of said frames during the initial tilting operation of the car, and cause the pivot of said yokes to follow a substantially horizontal path, and mechanism for simultaneously oscillating said frames to tilt the car on its longitudinal axis.

22. A car tilting apparatus comprising frames and pits therefor at each end of the car, and rails on said frames to receive the car trucks, the space between said frames beneath the car being unobstructed, arms mounted in said frames and having shoes for engaging the side walls of the car and adapted for relative independent movement, mechanism for projecting and retracting said arms, yokes mounted on said frames, arms pivotally connected at their upper ends to said yokes and at their lower ends to fixed points, and adapted to support one end of said frames during the initial tilting operation of the car, and cause the pivot of said yokes to follow a substantially horizontal path, and mechanism for simultaneously oscillating said frames to tilt the car on its longitudinal axis, said mechanism comprising inclined screws mounted in said pits and blocks thereon pivotally connected with said frames.

In witness whereof, I have hereunto set my hand this 4th day of March, 1922.

FRANK L. HAGUE.